June 10, 1958 J. W. CROWNOVER ET AL 2,838,723

PIEZOELECTRIC SIGNAL TRANSDUCERS AND CERAMIC TITANATE CAPACITORS

Filed Sept. 27, 1955 5 Sheets-Sheet 1

INVENTORS
J. W. CROWNOVER
H. W. KOREN
BY [signature]
ATTORNEY

INVENTORS
J. W. CROWNOVER
H. W. KOREN
BY
ATTORNEY

INVENTORS
J. W. CROWNOVER
H. W. KOREN
BY
ATTORNEY

INVENTOR.
J. W. CROWNOVER
H. W. KOREN
BY
ATTORNEY

INVENTORS
J. W. CROWNOVER
H. W. KOREN
BY [signature]
ATTORNEY 2,838,723

PIEZOELECTRIC SIGNAL TRANSDUCERS AND CERAMIC TITANATE CAPACITORS

Joseph W. Crownover, Sherman Oaks, Calif., and Heiman W. Koren, Bronxville, N. Y., assignors to Sonotone Corporation, Elmsford, N. Y., a corporation of New York Application September 27, 1955, Serial No. 536,794

6 Claims. (Cl. 317—242)

This application is a continuation in part of application Ser. No. 727,152 filed February 7, 1947 as a continuation in part of application Ser. No. 694,386 filed August 31, 1946 (now abandoned) and this application is also a continuation in part of application Ser. No. 772,934, filed September 9, 1947 as a continuation in part of application Ser. No. 694,386 filed August 31, 1946 (now abondoned) and of application Ser. No. 727,152, filed February 7, 1947.

This invention relates to piezoelectric signal transducers and ceramic capacitors or condensers, which may be used as piezoelectric transducers.

Among the objects of the invention is a novel electric capacitor of the type comprising a thin layer of substantially solid refractory dielectric titanate material which is fragile and liable to break in thin formation and having electrically conductive electrodes bonded to spaced surfaces of the dielectric layer, at least one of the electrodes comprising a metallic sheet element of a relatively strong ductile metal united to the dielectric layer, and serving as an armor-like backing for the brittle structure formed by the dielectric layer and the thin surface electrodes bonded thereto.

It is also among the objects of the invention to provide novel piezoelectric signal transducers wherein such a capacitor embodying a solid ceramic refractory dielectric body composed essentially of random oriented titanate particles, has been permanently electrically polarized by the application of an electric polarizing field for causing it to operate as a signal transducer which converts mechanical signals applied thereto into corresponding electric signals or vise versa.

The foregoing and other objects of the invention will be best understood from the following description of exemplifications thereof, reference being had to the accompanying drawings wherein.

Figure 4:
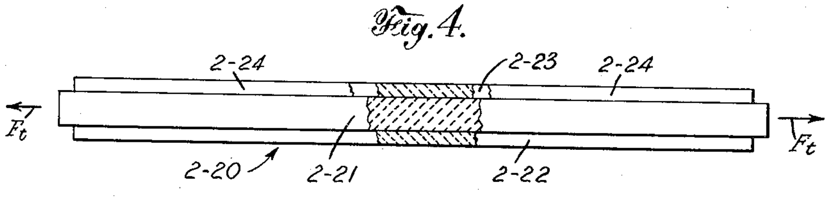
Figs. 4 and 5 are views similar to Figs. 1 and 2 of another form of capacitor exemplifying the invention.
Figure 5:
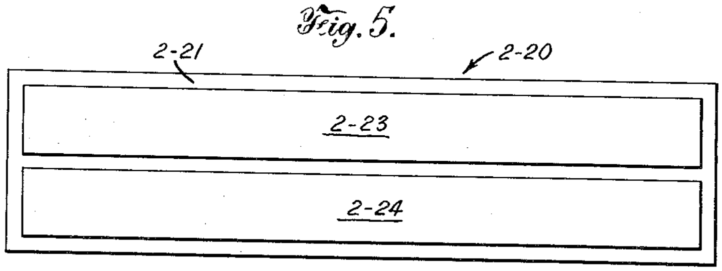
Figure 5A:
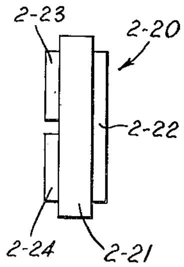
Figure 6:
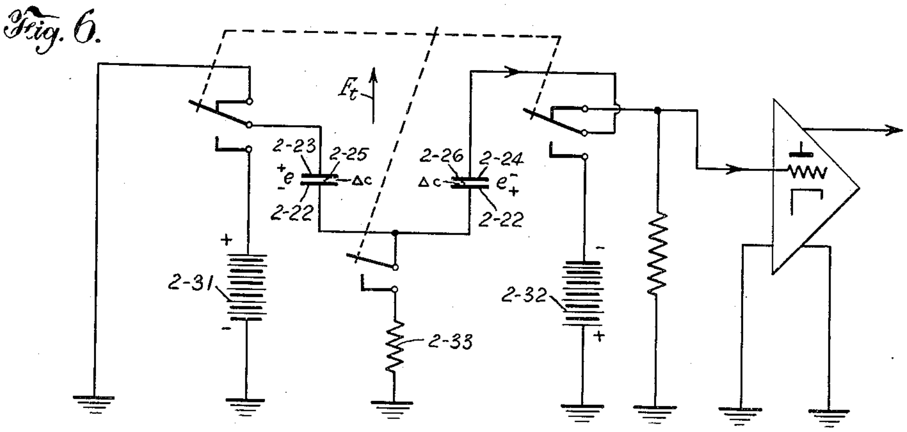
Figure 6A:
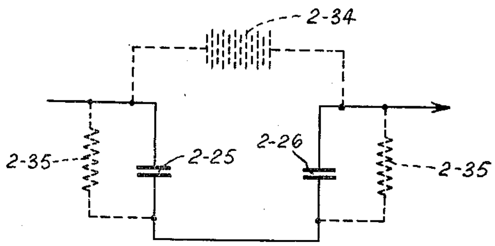
Figure 7:
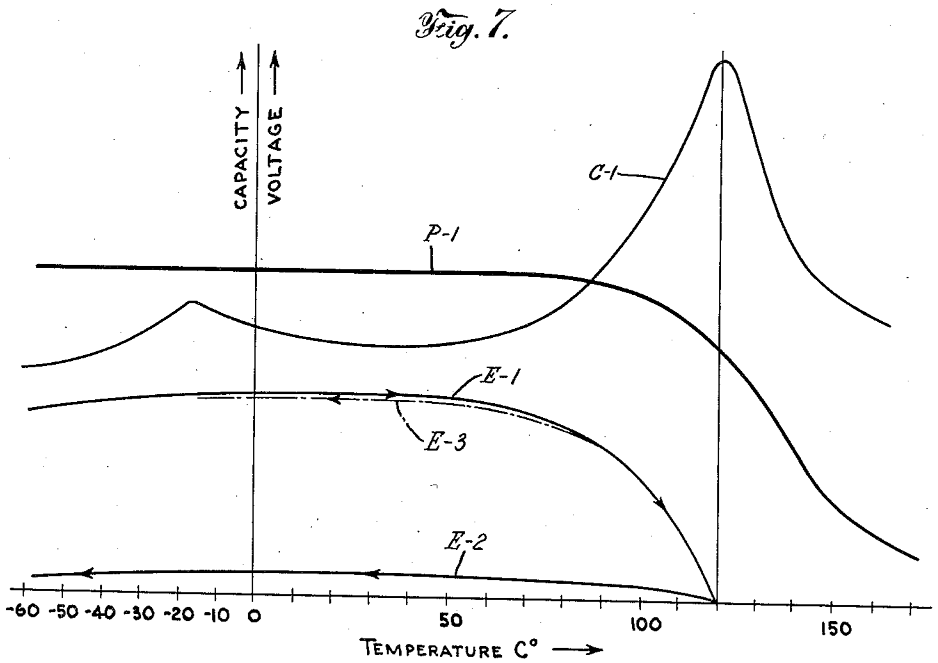
Figure 8:
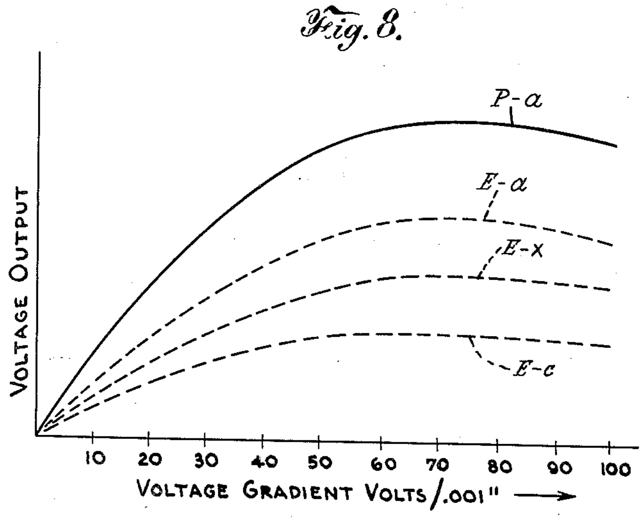
Figure 9:
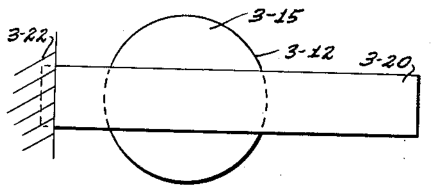
Figure 12:
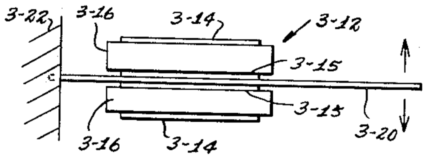
Figure 10:
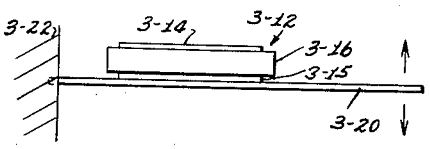
Figure 13:
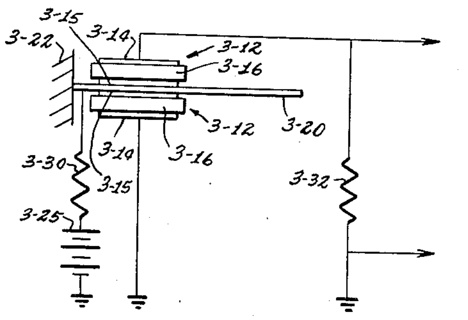
Figure 11:
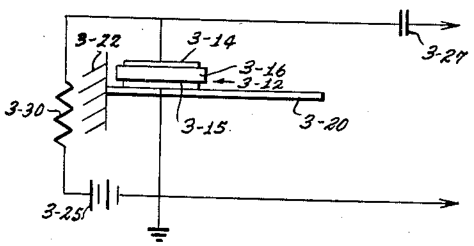
Figure 14:
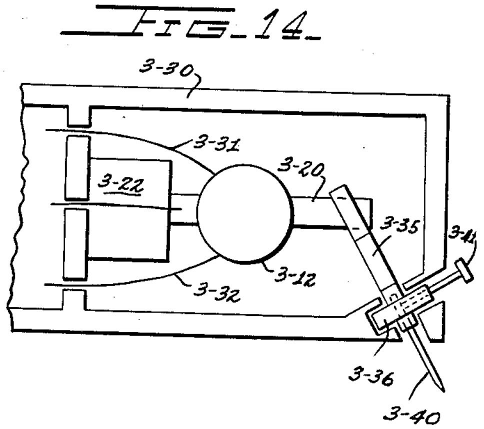
Figure 15:
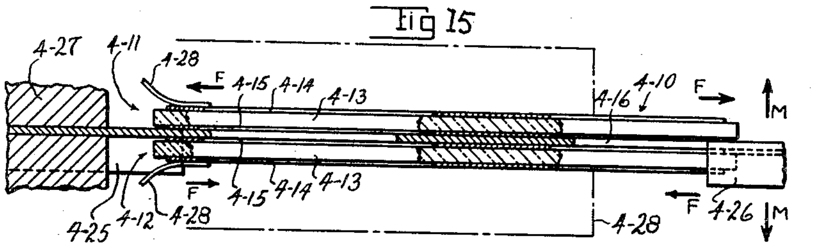
Figures 16, 17:
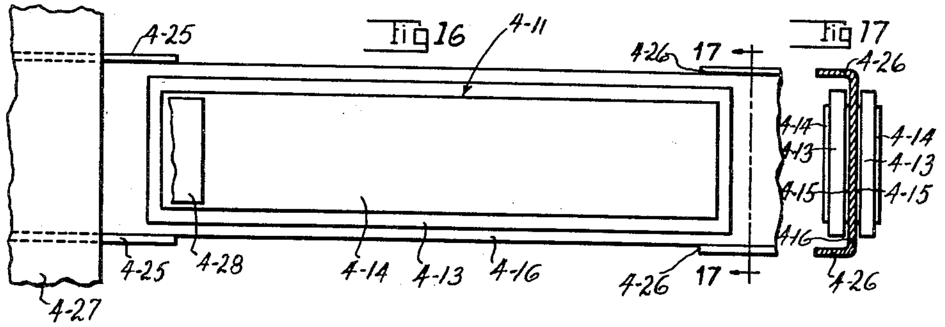
Figure 18:
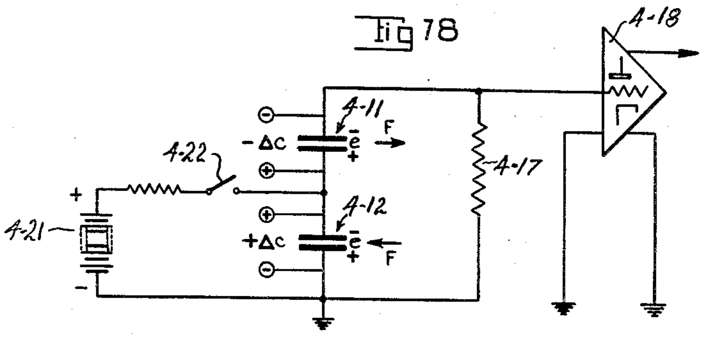

Fig. 5–A is an end view of the capacitor shown in Figs. 4 and 5;

Figs. 6 and 6–A are circuit diagrams showing different arrangements for polarizing a capacitor of the type shown in Figs. 4 and 5 so as to give such capacitor piezoelectric operating characteristics;

Figs. 7 and 8 show two sets of curve diagrams representing the operating characteristics of the polarized capacitors of the invention which render them suitable for use as mechano-electric or piezoelectric transducers in the same manner as the corresponding piezoelectric crystal elements are utilized in mechano-electric transducer applications;

Figs. 9 and 10 are plan and side views of a simple form of another form of piezoelectric signal transducer of the invention;

Fig. 11 is a circuit diagram of one manner in which a signal transducer of the invention may be used;

Figs. 12 and 13 are views similar to Figs. 10 and 11, respectively, of a further form of piezoelectric transducer of the invention;

Fig. 14 is a diagrammatic sectional view illustrating one form of a phonograph pickup exemplifying the invention;

Figs. 15, 16 and 17 are views similar to Figs. 4, 5 and 5–A of another form of piezoelectric transducer of the invention; and Fig. 18 is a circuit diagram showing one form of a polarizing arrangement for polarizing the dielectric elements of the transducer of Figs. 15–17.

Capacitors or condensers having a solid ceramic dielectric layer composed essentially of random oriented titanate particles have come into wide use. The titanate dielectrics have a high dielectric constant in the order of thousands and provide a large capacity in a small unit volume. They also exhibit a low power factor at high frequencies. They have the further advantage, in that titanate dielectric layers may be made by standard ceramic procedures in the form of refractory ceramic bodies, which are free from deterioration due to penetration of moisture into the dielectric.

The dielectric constant of titanates is a function of temperature. Depending on the composition, the value of the dielectric constant of a titanate dielectric goes through a maximum within a relatively narrow range of temperature. Thus, the dielectric constant of barium titanate ($BaTiO_3$) has a maximum dielectric constant at about 120° C. On the other hand a ceramic dielectric comprising a solid solution in the ratio of two molecules of barium titanate ($BaTiO_3$) per one molecule of strontium titanate ($SrTiO_3$) has a maximum dielectric constant at about zero degree C.

Solid titanate dielectric body layers for use in capacitors or condensers are made by more or less standard ceramic manufacturing procedures, and they all comprise polygranular refractory structures in which the crystal structures of the grains have random orientation.

In many low voltage applications it is of great importance to obtain with a condenser of a given size a maximum capacity effect. The maximum capacity is obtained by decreasing the thickness of the solid dielectric layer to a minimum. However, ceramic titanate dielectric layers, when made extremely thin, on the order of two to ten mils, are extremely fragile.

According to the invention, the foregoing difficulties encountered with extremely thin solid dielectric layers are overcome by embodying in at least one of the surface electrodes of such condensers or in both of its surface electrodes a ductile metallic backing layer or sheet of substantial strength united to the facing surface of the dielectric layer so that when the condenser structure is subjected to mechanical strains the metallic backing layer absorbs a large part of any mechanical strain to which the dielectric layer is subjected. A condenser of the invention has the further advantage that even if a condenser with such ductile electrode layers is flexed to a degree which causes the dielectric layer to fracture, the effectiveness of the ceramic dielectric layer is not impaired because the reinforced electrode layers bridge the fracture gaps and maintain all elements of the solid dielectric in their proper relationship with respect to the electrodes without decreasing the effective capacity of the condenser.

Figure 1:
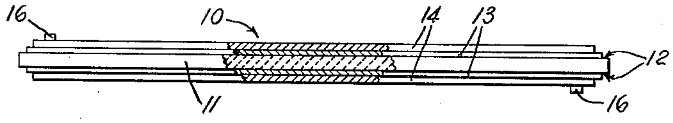
Fig. 1 is a side view of one form of capacitor exemplifying the invention.
Figure 2:
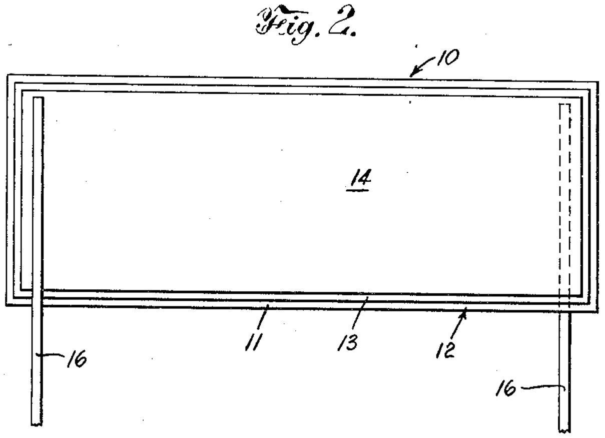
Fig. 2 is a plan view of the capacitor of Fig. 1.

One form of a condenser structure exemplifying the invention will now be described in connection with Figs. 1 to 3 which show such condenser with the dimensions of the several layers exaggerated for the sake of clarity.

The condenser 10 has a thin solid dielectric layer 11 composed essentially of a refractory ceramic material having a high dielectric constant such as a titanate. The two exposed extended surfaces of the dielectric layer are united to two extended surface electrodes generally designated 12. Each surface electrode 12 comprises an extremely thin layer or coat of a material, such as a silver composition, which has the property of becoming bonded and united in extremely intimate and direct contact with underlying exposed surface particles of the solid dielectric layer. According to the invention a sheet element 14 of relatively strong ductile metal is bonded and united to the exposed surface of each of the two electrode coatings 13 of the condenser so as to serve as a protective backing for the underlying brittle structure formed of the thin dielectric layer 11 and the electrode surface coatings 13 united thereto.

The backing layer 14 may be made of any material having substantial mechanical strength. Thus in case only one of the surface electrodes 12 of such condenser unit embodies a ductile sheet element 14 in accordance with the principles of the invention, the dimension and material of the sheet element 14 may be readily chosen so that when the condenser structure is exposed to mechanical strain, the sheet element 14 shall absorb at least 50 percent of the strain.

Similarly, if two sheet metal backing members 14 are united to the two electrode coating layers 13 of such condenser structure, the dimensions and material of the sheet metal elements 14 may be so chosen that when the combined condenser structure is subjected to strain the two sheet metal elements 14 absorb at least 50 percent of the strain.

In order to enable those skilled in the art to practice the invention, and without thereby limiting its scope, there will now be described a practical form of a condenser structure of the invention and one method of producing the same.

The dielectric layer 11 of the condenser was .4 x .6 x .003 inches in size and it was composed essentially of barium titanate. The thin electrodes 13 were composed essentially of a silver coating less than about $1/_{10,000}$ inch thick. The backing sheets 14 were of brass, each about $1/_{1000}$ inch thick.

Two thin metallic backing sheets, of a material such as brass or the like may be united as by soldering to the silver electrode coatings of the condenser structure. To this end, the condenser structure with its electrode coatings is dipped in molten solder thereby tinning the copper-plated surfaces. One or two backing sheets 14 are then sweated to the tinned electrode coatings of the condenser structure by holding the backing sheets in mechanical contact with the electrode coatings as indicated in Figs. 1 and 2 while heating the assembly to soldering temperature and then cooling.

Other procedures may be used for uniting the backing sheets to the electrode coating of such condenser structure.

Condensers of the invention having ductile metallic backing sheets united to the electrode surfaces of the dielectric layer have an outstanding advantage in their ability to retain their effective capacity even if they are flexed to a degree at which the solid dielectric layer fractures. This is due to the fact that the ductile metallic backing sheets serve as a conductive bridge which provides a mechanical and electrical bridge between the exterior surface portions of the fractured dielectric layer. This factor assures that condensers of the invention retain their capacity unimpaired even if they are subjected to strain which causes fracture of the dielectric that would otherwise destroy the effectiveness of the condenser.

Backing sheets 14 of a material, such as brass, having a thickness of only $1/_{1000}$ of an inch have been found to provide very satisfactory backing members for condensers of the invention.

The backing sheets may be provided with extensions which provide electrode connectors to external circuits. However, in many cases it is more practical to provide the external connector 16 by uniting a connector wire to the backing sheet.

Figure 3:
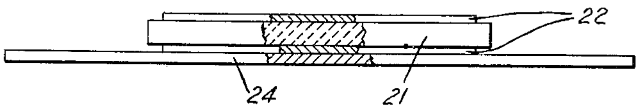
Fig. 3 is a view similar to Fig. 1 of a modification.

In Fig. 3 is shown a condenser of the invention equipped with only one backing sheet member. The dielectric layer 21 of insulating refractory material is united to its two extended surfaces by an extremely thin conductive electrode coating 22 as in the condenser of Figs. 1 and 2. A sheet element of ductile metal 24 which may be elastic to a higher or lesser degree is united to one of its electrode coatings 22 so as to form a ductile metallic backing sheet member united to the fragile condenser structure formed by its refractory dielectric layer 21 and the thin electrode coating 22. The backing sheet may be of a metal such as Phosphor bronze or stainless steel.

Another phase of the invention disclosed herein involves novel mechano-electric transducers for converting mechanical energy into electric signals and vice versa, of the general type used in phonograph pick-ups, microphones, pressure translating devices and the like.

According to the invention, novel mechano-electric transducers may be formed of one or more solid thin layers of polygranular refractory dielectric titanate material having surface electrodes which are permanently polarized and arranged in such manner that mechanical strains imparted to such condenser elements will produce across the electrodes corresponding potentials or voltages.

Figs. 4 and 5 illustrate one form of a polarized condenser element 2—20 of the invention designed for use as a part of one form of a novel practical application of the invention. It comprises a generally flat elongated condenser element 2—20. The condenser element 2—20 comprises a generally rectangular thin strip 2—21 of solid dielectric material provided along one extended surface thereof with a surface electrode 2—22 covering substantially its entire flat surface area and having on its opposite side two extended surface electrodes 2—23 and 2—24 each facing and cooperating with substantially one-half of the surface electrode 2—22 so that the single condenser structure of Figs. 4 and 5 actually represents two condenser elements interconnected in the manner shown in the diagram of Fig. 6 as two interconnected condenser elements 2—25 and 2—26, respectively. In other words, one part of the large common surface electrode 2—22 and the cooperating opposite surface electrode 2—23 of the condenser of Figs. 4 and 5 constitute condenser unit 2—25 of Fig. 6, and the other part of the large common surface electrode 2—22 and the cooperating opposite surface electrode 2—24 constitute the condenser 2—26 of Fig. 6.

We have found that when the solid dielectric layer 2—21 of a condenser unit of the type shown, is composed essentially of polygranular randomly oriented titanate particles, it may be polarized so that when the dielectric body of the condenser element is subjected to strains it will generate at its electrodes voltages corresponding to the strain. If such condenser element is subjected to a tension strain in the direction of its longitudinal axis, its dielectric constant and hence the capacity of both condenser elements 2—25 and 2—26 represented by the condenser unit 2—20 will decrease. Conversely, if such condenser unit is subjected to longitudinal compression the dielectric constant and hence the capacity of the two condenser elements 2—25 and 2—26 will be increased.

We have found that such condenser unit 2—20 may be permanently polarized and that when both condenser elements of such units are simultaneously subjected to the same character of strain, the changes of the dielectric constant or the capacity of the two serially acting condenser elements will produce aiding voltages provided oppositely sensed permanent polarizations had been previously induced in their respective dielectric body parts. In particular we have found that different characteristics of polarization may be imparted to such a condenser dielectric body so as to produce a variety of desired effects by the change in the dielectric constant imparted to such condenser. Thus, in order to cause such condenser unit to generate aiding voltages the internal polarization is imparted thereto by connecting the two serially acting condenser elements 2—25 and 2—26 in series with a D. C. source represented in Fig. 6 by batteries 2—31 and 2—32. The charging circuit is shown completed by the conventionally shown grounds, and by return resistor 2—33 connected between the mid-connection between the two serially acting condenser elements and ground so as to limit the charging current. The current-limiting resistor 2—33 serves also to prevent the application of a dangerous electric shock to personnel.

Alternatively, as shown in Fig. 6–A, a single battery 2—34 may be utilized for charging the two condenser elements 2—25 and 2—26 of such condenser unit 2—20, by connecting the battery 2—34 in series circuit relationship with the two condenser elements 2—25, 2—26. A resistance 2—35 is shown connected parallel to each condenser element 2—25, 2—26 so as to properly divide the polarizing potentials applied by the single battery 2—34 to the two condensers.

In Figs. 4 to 6, an arrow $F_t$ indicates the direction of a longitudinal tension force applied to the two condenser elements 2—25, 2—26. The change in the capacity of the two condenser elements is indicated in Figs. 6 and 6–A by the legend "ΔC." The legend "$\pm e$" and "$\mp e$," applied to the two condensers in Fig. 6, indicates the change in the potential produced by the effect of the tension force $F_t$ on the dielectric constant and the capacity of the two condenser elements 2—25, 2—26 when they have been permanently polarized by a D. C. potential source in the manner indicated by the polarity of the charging sources 2—31, 2—32 and 2—34, respectively. Although the two condenser elements are formed along adjacent portions of the same thin dielectric body 2—21, the electric polarization imparted to one part of the dielectric body 2—21 is opposite to the electric polarization imparted to the adjacent part of the same dielectric body 2—21.

In order to enable those skilled in the art to readily practice the invention and without thereby limiting its scope there are given below, by way of example, the data regarding physical characteristics of one polarized titanate condenser element of the invention made from commercially available titanates. The specific condenser element referred to above has a solid dielectric titanate layer .010 inch thick and an area 1 x .25 inch. Its solid dielectric structure consisted essentially of barium titanate.

In Fig. 7 curve C–1 shows the capacity of such condenser element as a function of the temperature indicated on the abscissae axis. It will be noted that the condenser element in question exhibits a maximum capacity at about 120° C. Dash-line curve branches E–1, E–2 represent the piezoelectric output voltage as a function of the temperature, when a constant displacement is imparted to the element. It will be seen, that when the temperature is first increased from the low value to the highest value and then decreased from the highest value to the lowest value, as indicated by the arrows on curve branches E–1, E–2, the alternating voltage output of the condenser element drops when the temperature of the titanate condenser is brought to a value at which it has the highest maximum capacity, and that its mechano-electric output voltage remains low when the temperature of the condenser element is thereafter decreased along curve E–2.

In Fig. 7 the dash-double dot line E–3 gives the mechano-electric output voltage of the condenser element, when after its temperature has been raised up to about 70° C. its temperature is lowered to its normal value from 70° C. to which it was first raised. Curve E–3 shows that if the temperature of the condenser element is not raised to a too high value, raising and lowering of the temperature does not materially effect its mechano-electric output voltage. For practical purposes the voltage characteristic E–3 substantially coincides over the range up to about 100° C., with the curve E–1. It is also of interest to know that in performing the tests represented by curves E–1, E–3, the condenser element was retained at a temperature of about 100° C. for an extended period of several weeks without any apparent loss of its mechano-electric voltage output.

Dot-line curve P–1 shows the output voltage of the condenser under constant mechanical displacement corresponding to the curves E–1, E–2, E–3, when its electrodes are connected to an external voltage source which was used to polarize the condenser and give it the mechano-electric characteristics represented by curves E–1, E–2, E–3. It will be noted that when the temperature of the condenser element is reduced even below minus 60° C., its mechano-electric output is not materially reduced.

We have found that generally similar characteristics are exhibited by condensers having dielectric bodies composed of titanates other than barium titanate alone. By way of example, there are given below data on a titanate condenser unit having a dielectric body containing about seventy percent barium titanate and about thirty percent strontium titanate in solid solution. This condenser element had a highest maximum capacity at about 40° C. The other characteristics of this condenser unit are qualitatively similar to those represented by the curves C–1, E–1, E–2, E–3 and P–1, except that the curves are shifted to lower temperature regions and that the ratio of ordinates of curve E–1 to the ordinates of curve P–1 was only about thirty percent as against seventy percent for the curves of Fig. 7.

In Fig. 8, curve P–*a* represents the piezoelectric voltage output for constant displacement of a condenser element having the characteristics shown in the curves of Fig. 7 as a function of the voltage gradient of the charging potential applied to its dielectric layer when the charging source remains connected to the condenser; curve E–*a* of Fig. 8 represents the corresponding mechano-electric voltage output when the charging source is disconnected from the condenser.

As shown by curves P–*a* and E–*a* the mechano-electric output voltage or sensitivity rises to an asymptotic value which may be designated as saturation value, with the increase of the voltage gradient of the charging voltage, and remains at a substantially constant value as the voltage is further increased till the breakdown voltage which occurs for the specific condenser unit at a voltage gradient of about 100 volts per one thousandth of an inch of thickness, corresponding to about 39,350 volts per centimeter.

When operating with a condenser element of the invention having a titanate body which was composed of about seventy percent barium titanate and about thirty percent strontium titanate in solid solution, there was obtained a mechano-electric output or sensitivity characteristic represented by curve E–*c* in Fig. 8.

Condensers made with other titanate compositions will exhibit generally similar characteristics, such as represented by curve E–*x* in Fig. 8.

Depending on the composition of the titanate dielectric body of a piezoelectric condenser of the invention, a longer or shorter charging period is required in order to induce in it the desired piezoelectric characteristics as explained in connection with Fig. 8. Thus, in case of a condenser unit having a dielectric body consisting essentially of barium titanate, the desired piezoelectric characteristics may be induced therein by applying thereto the charging potential of about 50 volts per 1/1000 inch thickness only for about a few minutes, at room temperature of about 25° C. Thus, if such condenser unit is subjected to a charging potential for five minutes, and if it is thereafter left connected to the charging source, its piezoelectric output or sensitivity will not be materially increased beyond that which it acquires within the first five minutes of the charging process.

For condenser units having dielectric bodies composed of other titanates, the required charging time will vary. Thus, in case of a condenser having a dielectric layer composed of about 70 percent barium titanate and about 30 percent strontium titanate in solid solution, a charging period of several days may be required in order to induce therein desired permanent piezoelectric characteristics.

Summarizing, we have found that such condenser elements having a solid titanate dielectric layer formed of random oriented particles, when subjected to a deformation which causes them to change their capacity, will produce voltages corresponding to the deformation not only in the presence of an externally applied electrically polarizing field but also as a result of permanent displacement of electric charges in the internal structure of the dielectric imparted thereto by subjecting it to an electric polarizing process, and which gives it what appears to be electric properties.

According to the invention, as shown in Fig. 8, permanent electric polarization or piezoelectric characteristics of asymptotic or saturation value may be imparted to the dielectric titanate structure of such condenser unit, by connecting it to a source of D. C. potential so that a voltage gradient of about 60 volts per 1/1000 inch thickness or about 20,000 volts per centimeter is applied thereto for a shorter or longer period of time from about five minutes or less up to one or more days, depending on the characteristics of the specific titanate body. When such a plurality of condenser sections or elements are combined into bilaminates, such permanently induced polarization may be conveniently applied to them, and in the proper sense, so their effectiveness aids when functioning as a mechano-electric transducer.

Condensers made with other titanate compositions will exhibit generally similar characteristics, such as represented by curve E—$x$ in Fig. 8.

Figs. 9 to 11 show one practical form of a signal transducer of the invention. It comprises a titanate capacitor 3—12 formed essentially of a solid dielectric layer 3—16 of random oriented titanate particles having two surface electrodes 3—14, 3—15 united to its opposite flat surfaces. To one of the metallic surface electrodes, for instance to the surface electrode 3—15 of the capacitor 3—12, is united, as by soldering, one surface of a flexible spring-like beam member 3—20, one end of which is anchored in a fixed support 3—22. When a source of direct current potential, shown in Fig. 11 as a direct current battery 3—25, is connected to the two opposite electric surfaces 3—14, 3—15 of the capacitor, the dielectric particles of the dielectric layer 3—16 will become electrically polarized. The polarizing circuit may include a resistance 3—30 connected in series with the direct current voltage source 3—25 to the two electrodes 3—14, 3—15 of the capacitor. Movement of the free end of the spring-like beam member 3—20 in downward direction, as indicated by the downward arrow applied thereto, will cause the dielectric layer 3—16 of the capacitor 3—12 to be strained in longitudinal direction by tensioning forces applied to the two ends of the capacitor. When such dielectric layer of the capacitor 3—12 is subjected to tensioning forces its capacitance will decrease, and as a result of the strain imposed on the dielectric it will produce a corresponding voltage across its two electrodes 3—14, 3—15. If the spring-like beam member 3—20 is deflected in upward direction, as indicated by the upward arrow applied to its free end, the dielectric layer will be compressed in its longitudinal direction, thereby subjecting its dielectric particles to an opposite strain which will cause the capacitance of the capacitor to increase, and this change in the strain of the dielectric particles will produce across its electrodes a voltage opposite to that produced by a deflection in the downward direction described above.

The electric signal output of a transducer device such as described in connection with Figs. 9 to 11 may be supplied to the input stage of an amplifier through an input circuit including a coupling condenser 3—27, in the manner indicated in Fig. 11 by the two arrow-leads to the right. Once the polarizing potential has been applied to the dielectric layer of the capacitor 3—12, the battery 3—25 may be disconnected. If the polarizing voltage source 3—25 is left connected to the capacitor 3—12, the series resistance 3—30 is connected in the polarizing circuit to prevent the electric signal from being shunted by the low impedance of the polarizing source 3—25.

In Figs. 12 and 13 is shown another embodiment of the invention. It comprises a similar spring-like beam member 3—20 having one end anchored in a fixed support 3—22. To the opposite sides of the beam member 3—20 are united two similar capacitor elements 3—12, each comprising a solid dielectric titanate layer 3—16 and two metallic surface electrodes 3—14, 3—15 bonded to the two flat faces of the dielectric layer. To capacitors 3—12 are united the opposite flat surfaces of the metallic beam member 3—20, for instance, by soldering the surface electrode 3—15 of each of the two capacitors to the opposite surface portions of the beam member 3—20. The dielectric layer of the two capacitors 3—12 is polarized by connecting them to a direct voltage polarizing source, such as a battery 3—25, through a suitable polarizing circuit. As shown in Fig. 13, the polarizing battery source 3—25 has one terminal grounded and the other terminal connected through a resistor 3—30 to the metallic beam member 3—20, and therethrough to the two surface electrodes 3—15 of the two capacitors 3—12 united thereto.

The polarizing circuit is completed by connecting the two outer electrodes 3—14 of the two capacitors 3—12 to ground, one grounding connection being shown leading directly to ground, and the other grounding connection leading to ground through a resistor 3—32. With such transducer arrangement, flexing of the beam member 3—20 in one direction will strain the dielectric layer of one of the capacitors 3—12 in one manner (i. e. compression), while the dielectric layer of the other capacitor 3—12 is strained in the opposite manner (i. e. tension). By polarizing the dielectric layers of the two capacitors in the manner indicated in Fig. 13, the vibratory motion imparted to the beam member 3—20 will produce across the two serially connected capacitors 3—12 aiding voltages and deliver a push-pull signal output corresponding to the vibrations. As shown in Fig. 13, the electric signal output is developed across the resistor 3—32 and is supplied through the two arrow-leads extending to the right from across the resistor 3—32 to an input stage of an amplifier. Once the dielectric layers of the two capacitors 3—12 of the transducer shown in Fig. 13 are polarized, the polarizing circuit including the polarizing source 3—25 may be disconnected from the circuit shown.

With a transducer of the invention connected to an input stage of an amplifier, in the manner shown in Fig. 11, the two capacitors 3—12 will operate in series and their output voltages will reinforce each other, increasing the output impedance as well as the output voltage.

With a transducer arrangement of the type described in connection with Figs. 12 and 13 having capacitors 3—12 with dielectric titanate layers, each having a thickness of ten mils and polarized by a voltage of 200 volts, it is possible to obtain a substantial voltage output when the beam is vibrated by a conventional phonograph record groove.

Without thereby limiting the scope of the invention, but only to facilitate the practice thereof, there are given below the data of one practical form of a transducer of the type described in connection with Figs. 9 to 11.

The dielectric layer of the capacitor had a thickness of ten thousandths of an inch. The two electrodes were formed of silver coatings bonded to the flat faces of the dielectric layer. One electrode coating was directly soldered to one flat side of a metal spring of Phosphor bronze material fifteen thousandths of an inch thick. Although the capacitor 3—12, shown in Figs. 9 to 11 is of circular shape, the capacitor may be of rectangular shape and it need not project beyond the borders of the metallic beam spring member 3—20. The spring beam member 3—20 may be made of a resilient non-metallic sheet member, and one electrode of the capacitor 3—12 may be cemented thereto.

Fig. 14 shows how a transducer described in connection with Figs. 12 and 13 may be utilized in a phonograph pick-up. The housing 3—30 carries in its interior a mounting block 22 in which the rear end of the beam member 3—20 carrying the two capacitor elements 3—12 is anchored. The front end of the beam member 3—20 is engaged by the forked upper end of a needle holder 3—35. Needle holder 3—35 is provided with a pivot member 3—36 pivotally mounted in a conventional way in suitable fixed bearings of the housing 3—30. A needle 3—40 is held in a conventional way within the needle holder by means of a conventional screw 3—41. Suitable leads 3—31, 3—32 connected to the outer electrodes 3—14 of the two serially operating capacitor elements 3—12 supply their output to the amplifier circuit. The frequency response of a pick-up, such as shown in Fig. 14, is excellent and even better than that obtainable with conventional pick-ups using Rochelle salt crystal transducers.

Transducers of the type shown in Figs. 10 to 13 may be readily used as microphones. Thus, by connecting the apex of a conventional microphone diaphragm to the free end of the beam 3—20 of the transducer, such as shown in Figs. 10 and 12, the titanate condenser elements of the transducer will generate a voltage output corresponding to the vibrations imparted to the microphone diaphragm. Electrically polarized transducers of the type described above may lend themselves for use in filters. For example, two transducer capacitors may be affixed to the opposite ends of a longitudinally extending member, such as a metal rod, the length of which is adjusted to resonate to compressional vibrations of a specific frequency. Electric signals fed to one capacitor transducer which is connected to one end of the rod will cause it to vibrate and transmit the vibrations to the capacitor transducer which is connected to the other end of the rod, and cause the latter to generate a voltage only if the signals are of the resonant frequency of the combined system formed by the rod with the two capacitor transducers united thereto.

The titanate transducers of the invention of the type described above have many advantages. They are not sensitive to humidity. They will operate over a wider range of temperature variations than Rochelle salt crystal transducers. The surface electrode may be directly soldered to an associated operating structure, such as a beam or lever, and will form therewith an extremely rugged structure. It presents a lower impedance compared to the piezo-electric crystal transducers, thus minimizing the shielding problem although the impedance of the titanate capacitor transducer is high enough for direct feeding of electric signals to the input grid of a vacuum tube amplifier. It is small in size and light in weight. It has linear frequency response. It is inexpensive.

For light weight phonograph pick-ups, a needle may be affixed directly to one end of the beam of a polarized titanate capacitor, the other end of the beam being directly affixed to the tone arm. In another construction the needle may be of the so-called permanent type and welded or soldered directly to the polarized transducer capacitor. The entire needle and transducer capacitor assembly may be replaced as a unit when necessary.

Figs. 15, 16, 17 show a further form of piezoelectric or dielectrostrictive ceramic titanate transducer of the invention. It comprises a metallic thin backing sheet 4—16, which has united to its opposite exterior surfaces the two electrodes 4—15 of the ceramic titanate condenser units 4—11, 4—12, by placing them in juxtaposition in a suitable soldering fixture and then passing them through a heating region, such as a tunnel, which raises the assembled structure to the solder temperature so that after subsequent cooling the two condenser elements are integrally united along their electrode surfaces 4—15 to the backing element 4—16.

According to the invention, a combined multiple condenser structure of the general type shown in Figs. 15 to 17 may be permanently electrically polarized in opposite senses so that when the two condenser elements of such polarized condenser structure are simultaneously subjected to strains of opposite character the changes of the dielectric constant or the capacity of the two condenser elements will produce aiding voltages.

When two such condenser elements are combined into a bilaminate structure such as shown in Figs. 15 to 17 such permanently induced polarization may be conveniently applied in the proper sense so that their effectiveness aids when functioning as a mechano-electric or electro-mechanical transducer structure.

Fig. 18 shows one form of an electric circuit by means of which such bilaminate condenser unit which is to serve as an energy transducer may be permanently polarized in accordance with the invention. The condenser elements 4—11, 4—12, are shown connected in series across a resistance 4—17, which may serve as an input resistance of an amplifier 4—18 which serves to amplify the electric signals generated by the transducer structure in response to mechanical strains imparted thereto. A source of D. C. charging potential which may be provided by a battery 4—21 which is shown connected through a switch 4—22 between the terminals to the two condenser elements 4—11, 4—12, to the grounded side of the resistance 4—17, so as to apply to the two condenser elements 4—11, 4—12 equal unidirectional voltages which act electrically in parallel across the two condensers but which are oppositely directed with respect to the series relationship of the two condenser elements 4—11, 4—12.

In Fig. 18 the arrows F indicate the direction of the longitudinal forces applied to the two condenser elements 4—11, 4—12 when the entire condenser assembly structure is subjected to a bending strain for instance. Thus condenser element 4—11 is subjected to a stress F while at the same time the condenser element 4—12 is subjected to an opposite stress F. The legend $-\Delta C$ and $+\Delta C$ applied to the two condenser elements 4—11, 4—12 indicates the change of the capacitance produced in the two condenser elements by the two opposite forces F and F. The legend $\mp e$ applied to the two condenser elements 4—11, 4—12 indicates the change in the incremental voltages produced in the two condenser elements by the effect of the opposite strains F and the resulting opposite changes in the capacitance in the two condenser elements when they have been permanently polarized by a D. C. potential source in the manner indicated.

A dielectrostrictive transducer structure of the invention, such as shown in Figs. 15 to 17, may be used either for transforming mechanical strains or motions into electric signals, or vice versa.

Figs. 15 and 16 indicate in a diagrammatic manner one way in which such transducer structure of the invention may be utilized as a mechano-electric transducer unit, or vice versa. As shown the left end of the backing strip 4—16 is provided with two angularly bent flange portions 4—25, and the right end of the backing strip is likewise provided with two angularly bent flange portions 4—26, both sets of flange portions 4—25, 4—26 overlapping the adjacent end portions of the condenser elements 4—11, 4—12 which are united to the backing strip 4—16. Because of this arrangement bending forces imparted to the flanged end portions of the backing strip will cause the entire length of the two condenser elements 4—11, 4—12 to bend as a unit, so that the bending forces applied to the ends of the backing strips are properly transmitted to the entire length of the condenser structure united to the backing strips.

Instead of providing the rear end of such transducer structure with a stiffened mounting end, the proper distribution of the mechanical forces over the condenser transducer elements 4—11, 4—12 thereof may be obtained by embedding a larger or shorter length of the two outer sides of the condenser elements 4—11, 4—12 between layers, pads or a body 4—29 of flexible, elastically yieldable cushioning material so that when the forward end of the condenser structure is flexed the cushioning bodies 4—29 within which the transducer is embedded will react against the flexed condenser elements and provide the desired distribution of the strains along their entire length. The elastically yieldable body 4—29 may be made of a material such as vinylchloride which is plasticized so as to be soft and exhibit rubbery elastic characteristics and is effective in internally dissipating vibratory energy imparted thereto.

In the arrangement shown the backing sheet element 4—16 is made of conductive material and provides an electrical circuit connection between the inwardly facing surface electrodes 4—15 of the two condenser elements 4—11, 4—12. In some applications it may be desirable to make the backing sheet element 4—16 of electrically non-conductive material, in which case the circuit connection between the two condenser elements may be provided by a suitable electrically conductive jumper element of metallic foil, for instance, extending between the two facing electrode surfaces.

The condenser transducer structure, generally designated 10, comprises two condenser units 4—11, 4—12, each having a thin solid dielectric layer 4—13 composed essentially of a refractory ceramic titanate material. To the two exposed extended surfaces of each dielectric layer 4—13 are united extended surface electrodes 4—14, 4—15. Each surface electrode 4—14, 4—15 comprises an extremely thin layer or coat of an electrically conducting material such as a silver composition which has the property of becoming bonded and united in extremely intimate and direct contact with the underlying exposed surface particles of the solid dielectric layer 4—13. In order to give the two condenser units 4—11, 4—12 substantial mechanical strength notwithstanding the fragile character of their thin dielectric structure, they are shown joined to a ductile sheet backing member 4—16, as by uniting their thin electrode coatings 4—15 to the exposed opposite surfaces of the relatively tough thin sheet member 4—16 in such manner that the sheet member 4—16 shall provide a non-fragile backing for each of the two condenser elements 4—11, 4—12. The sheet member 4—16 may be made either of a ductile metal or of a strong synthetic resin or plastic sheet material, for instance, such a fabric impregnated with a synthetic resin or plastic of the type long and generally used in making tough sheets.

In accordance with one phase of the invention, the sheet element 4—16 which serves as a backing of the two condenser elements 4—11, 4—12, is made of metal and utilized as an electrode structure for the two condenser elements 4—11, 4—12, which are united thereto and which form therewith a substantially integral mechanically strong multiple condenser transducer structure.

By combining a condenser transducer structure of the type shown in Figs. 15 to 17 with a ductile backing sheet, it is given great mechanical strength without substantially increasing its stiffness against deformation or bending in a direction perpendicular to the plane of the backing sheet element 4—16. However, the backing sheet element will add greatly to the strength of the condenser transducer structure against forces in the direction substantially parallel to the plane of the sheet member 4—16.

By way of example there will now be given structural data of a piezoelectric ceramic titanate bilaminate of the type described in connection with Figs. 15 to 17 which is suitable for a phonograph pickup. Each titanate body layer 4—13 is about ⅝ inch long, ⅜ inch wide, and about 0.010 inch thick. Each dielectric body layer 4—13 is composed essentially of ceramically joined barium titanate particles and its dielectric constant has its maximum value, or its Curie point is at about 120° C. The backing strip 4—16 is of suitable ductile metal such as nickel-silver sheet material about 0.005 to 0.010 inch thick.

The features and principles underlying the invention described above in connection with specific exemplifications will suggest to those skilled in the art many other modifications thereof. It is accordingly desired that the appended claims shall not be limited to any specific feature or details thereof.

We claim:

1. In a capacitor structure: a thin dielectric layer of substantially solid refractory dielectric material which is fragile and liable to break when in thin formation; conductive electrode layers on the opposite sides of said dielectric layer; said electrode layers being formed by fusion of metal particles at temperatures above 400° C. to the exposed surfaces of said dielectric layer; one of said electrode layers comprising a sheet portion of metal of substantial strength mechanically and electrically united to the facing surface of said dielectric layer so that when said capacitor structure is subjected to mechanical strain said metal sheet portion absorbs a substantial part of such mechanical strain.

2. In a capacitor structure: a thin dielectric layer of substantially solid refractory dielectric material comprising a titanate and which is fragile and liable to break when in thin formation; conductive electrode layers on the opposite sides of said dielectric layer; said electrode layers being formed by fusion of metal particles at temperatures above 400° C. to the exposed surfaces of said dielectric layer; at least one of said electrode layers comprising a sheet portion of metal of substantial strength mechanically and electrically united to the facing surface of said dielectric layer so that when said capacitor structure is subjected to mechanical strain said metal sheet portion absorbs a substantial part of such mechanical strain.

3. In a capacitor structure: a thin dielectric layer of substantially solid refractory dielectric material which is fragile and liable to break when in thin formation; two conductive electrode layers on the opposite sides of said dielectric layer; each of said electrode layers comprising a relatively strong sheet portion of metal mechanically and electrically united to the facing surface of said dielectric layer so that when said dielectric layer is fractured said metal sheet portion provides mechanical and electrical union between the fractured portions of the dielectric layer.

4. In a capacitor structure: a thin dielectric layer of substantially solid refractory dielectric material comprising titanate material and which is fragile and liable to break when in thin formation; two conductive electrode layers on the opposite sides of said dielectric layer; each of said electrode layers comprising a relatively strong sheet portion of metal mechanically and electrically united to the facing surface of said dielectric layer so that when said dielectric layer is fractured said metal sheet portion provides mechanical and electrical union between the fractured portions of the dielectric layer.

5. In a capacitor structure: a thin dielectric layer of substantially solid refractory dielectric material which is fragile and liable to break when in thin formation; two conductive electrodes on the opposite sides of said dielectric layer; said electrode layers being formed by fusion of metal particles at temperatures above 400° C. to the exposed surfaces of said dielectric layer; one of said electrode layers comprising a sheet portion of metal mechanically and electrically united to the facing surface of said dielectric layer so that when said dielectric layer is fractured the metallic sheet portion provides mechanical and electrical union between the fractured portions of the dielectric layer, said sheet portion being of substantial strength so that when said capacitor structure is subjected to mechanical strain said sheet portion absorbs a substantial part of such mechanical strain.

6. In a capacitor structure: a thin dielectric layer of substantially solid refractory dielectric material comprising a titanate and which is fragile and liable to break when in thin formation; two conductive electrode layers on the opposite sides of said dielectric layer; each of said electrode layers comprising a sheet portion of metal mechanically and electrically united to the facing surface of said dielectric layer so that when said dielectric layer is fractured the metallic sheet portions provide mechanical and electrical union between the fractured portions of the dielectric layer, said sheet portions being of substantial strength so that when said capacitor structure is subjected to mechanical strain said sheet portions absorb a substantial part of such mechanical strain.

No references cited.